W. DUNN.
NUT LOCK.
APPLICATION FILED AUG. 14, 1919.

1,334,359.

Patented Mar. 23, 1920.

INVENTOR
WILLIAM DUNN
BY
J. L. Rivers
ATTORNEY

UNITED STATES PATENT OFFICE.

WILLIAM DUNN, OF SEATTLE, WASHINGTON.

NUT-LOCK.

1,334,359.  Specification of Letters Patent.  Patented Mar. 23, 1920.

Application filed August 14, 1919. Serial No. 317,534.

*To all whom it may concern:*

Be it known that I, WILLIAM DUNN, a citizen of the United States, residing at Seattle, in the county of King and State of Washington, have invented a new and useful Improvement in Nut-Locks, of which the following is a specification.

My invention relates to improvements in nut-locks in which resilient jaw members engage the threads of a bolt, and a locking element serves to hold the nut-lock in operative position; the objects of my improvement being to provide a nut-lock which is adapted to any ordinary nut and bolt, and so constructed that when once used it can be easily removed, without impairing its structure, and utilized again.

My invention can be understood, by reference to the accompanying drawing, in which—

Figure 5:

Fig. 5 an elevation of said eccentric nut, showing in plan, two eccentric recesses.

Figure 6:
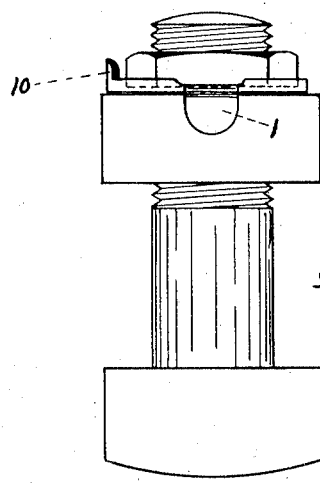

Fig. 6 is an elevation of a bolt and nut, with said nut-lock in operative position.

Figure 1:
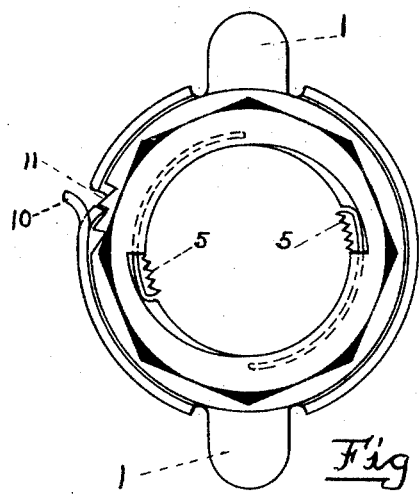
Figure 1 is a plan view of the lock assembled, with nut-embracing lugs unbent.
Figure 2:
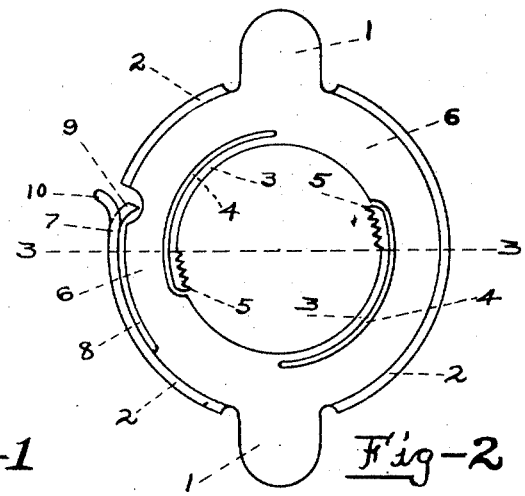
Fig. 2 is a plan view of spring washer, with said lugs.
Figure 4:
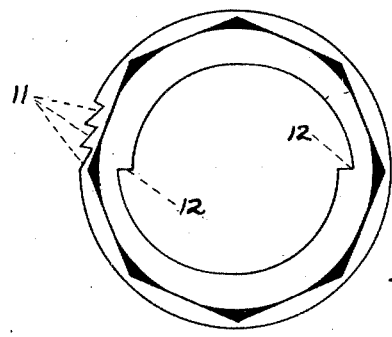
Fig. 4 is a plan view of an eccentric nut, used in connection with the washer illustrated in Fig. 2.
Figure 3:
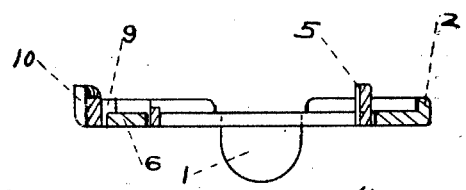
Fig. 3 is a cross-section drawn on the line 3—3 of Fig. 2.

In the drawings 1 represents lugs connected with the body of what I term a spring washer. In Figs. 1 and 2, for convenience, these are shown as extending outwardly in the plane of the body of the washer, but when the device is assembled ready for the market, each of said lugs will extend downwardly substantially at right angles to said body and when in use will embrace sides of the nut as illustrated in Fig. 6. 2 represents flanges extending upwardly and circumferentially for the attachment of the eccentric nut shown in Fig. 4, and within which said nut is adapted to rotate. 3 are two resilient members each formed by a kerf 4 in the body of the washer and having at their free ends upstanding jaws 5, the faces of which are serrated and adapted to engage the threads of a bolt. Said jaws extend along said resilient members for approximately the distance shown at 6, in Fig. 2. In Fig. 3 one of these jaws 5 is illustrated in detail, and in Fig. 1 said jaws are shown as they appear when the device is assembled ready for use. 7 is a resilient member, being a section of flange and body made resilient by the kerf shown at 8. This member carries at its free end a locking lug 9 and a release lug 10. The locking lug 9 is adapted to engage any one of the notches 11, Fig. 4, when the eccentric nut shown in Fig. 4 is attached to the washer. The release lug 10 is adapted to release said locking lug 9 from engagement with said notches. 12 represents eccentric recesses on the inner periphery of the eccentric nut which serve, when said nut and washer are in operative position, to force the jaws 5 against the threads of the bolt, and contribute to the release of the same.

In assembling the device, the eccentric nut shown in Fig. 4 is rotatably attached to said washer by means of the flanges 2. It is placed on the bolt and nut as shown in Fig. 6. By turning the eccentric nut, the eccentric recesses 12 engage the jaws 5, forcing them inwardly and against the threads of the bolt. As said eccentric nut is threadless it can be tightened by these jaws coming in contact with the threads of the bolt, and at the same time the pressure of the jaws against the threads can be regulated by the operator. When sufficient pressure is applied the eccentric nut is locked by the lug 9 engaging one of the notches 11, a plurality of which are provided for giving adjustment. This locking lug is an integral part of the member 7, said member possessing resiliency by reason of the material of which it is composed and the kerf 8. Should it be desired to remove the device it is accomplished by springing back the release lug 10, thus withdrawing the lock lug 9 from one of the notches 11, then by rotating the eccentric nut in the opposite direction from that in which the device was applied, the eccentric recesses 12, together with the resiliency of the members carrying the jaws 5, release said jaws from the threads of the bolt, and the lock can then be lifted from the nut and bolt and used again.

It will be noted that the device requires no bending by the operator, it can be used with ordinary stock nuts and bolts, it carries no threads, it does not injuriously mutilate the bolt, and can be easily applied and removed without destroying its structure.

Having thus described my invention, I claim:

1. A device of the class described, comprising in combination with a bolt and a nut thereon, a washer having downwardly extending lugs adapted to embrace a nut, said washer having on its inner circumference a pair of oppositely located integral resilient members carrying at their free ends upwardly extending jaw members, the faces of which are serrated and adapted to engage the threads of a bolt, circumferential flanges whereby an eccentric nut may be rotatably attached, at its outer circumference an integral resilient member carrying at its free end an inwardly extending lock lug and an outwardly extending release lug, a nut rotatably mounted on said washer, having on its inner circumference eccentric elements adapted to force said jaws against the threads of the bolt and to release the same therefrom.

2. A device of the class described, comprising in combination with a bolt and a nut thereon, a washer having on its outer circumference dependent lugs, on its inner circumference movable jaws, an eccentric nut rotatably mounted on said washer adapted to force the jaws against the bolt, means for retaining said nut-lock in operative position.

WILLIAM DUNN.